United States Patent [19]

Price

[11] 4,210,624
[45] Jul. 1, 1980

[54] UNIVERSAL CHLORINATOR MODULE

[75] Inventor: Kenneth E. Price, Whittier, Calif.

[73] Assignee: Rainbow Lifegard Products, Inc., El Monte, Calif.

[21] Appl. No.: 906,673

[22] Filed: May 15, 1978

Related U.S. Application Data

[63] Continuation of Ser. No. 735,964, Oct. 27, 1976, abandoned.

[51] Int. Cl.² ............................................. B01D 11/02
[52] U.S. Cl. .................................. 422/264; 422/277; 422/282
[58] Field of Search .............. 210/169, 62; 422/264 B, 422/282, 278, 263, 266, 274, 277

[56] References Cited

U.S. PATENT DOCUMENTS

| | | | |
|---|---|---|---|
| 1,033,717 | 7/1912 | McClellan | 251/6 |
| 1,409,248 | 3/1922 | Levcik | 422/264 B |
| 2,142,947 | 1/1939 | Kretzschmar | 422/264 B |
| 2,908,476 | 10/1959 | Hidding | 251/6 |
| 3,410,517 | 11/1968 | Wall | 251/8 |
| 3,456,801 | 7/1969 | Bowles | 210/169 |
| 3,828,983 | 8/1974 | Russo | 422/264 |
| 3,899,425 | 8/1975 | Lewis | 210/169 |

*Primary Examiner*—Hiram H. Bernstein
*Attorney, Agent, or Firm*—Christie, Parker & Hale

[57] ABSTRACT

A chlorinator is used in a swimming pool system having a filter assembly and a pump for circulating water from the pool through the filter assembly and back to the pool. The chlorinator comprises a housing which defines therein a selectively-openable airtight chamber adapted for receiving therein a quantity of water-soluble dry chlorine material. A water inlet port opens to the chamber essentially at the bottom end thereof, and a separate water outlet port opens from the chamber also essentially at the bottom of the chamber. The inlet port is adapted for connection thereto of an adjustably valved duct by which water to be chlorinated can be applied to the inlet port. A check valve is coupled to the outlet port to prevent water flow through the outlet port to the chamber. The chlorinator is connectible in a pool system in parallel to the filter assembly, for example.

4 Claims, 4 Drawing Figures

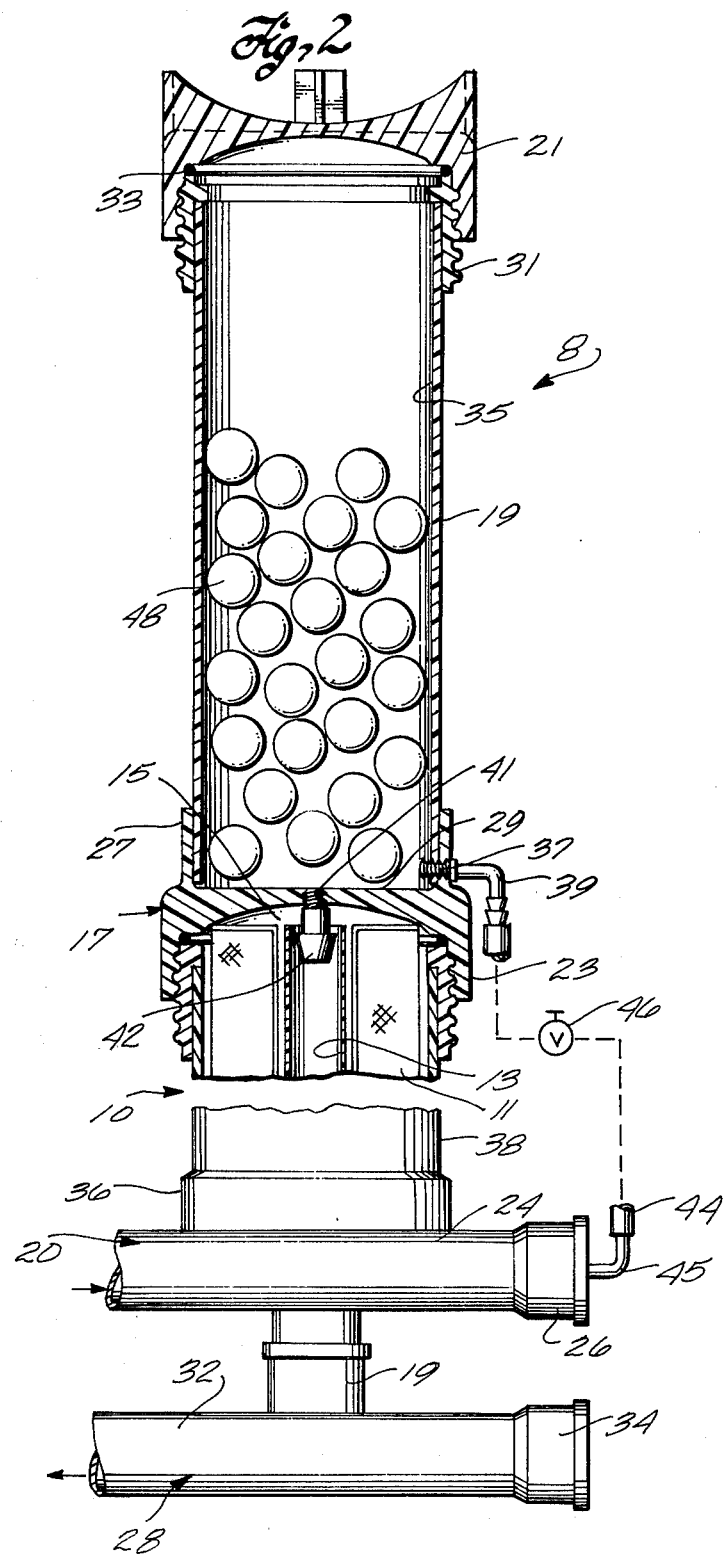

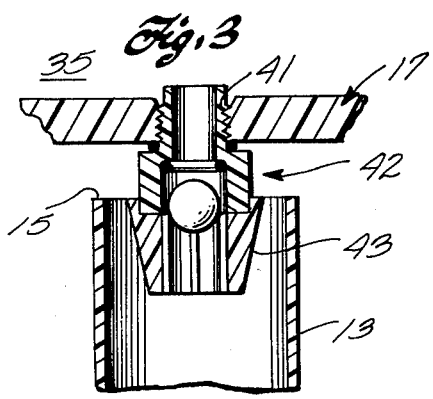
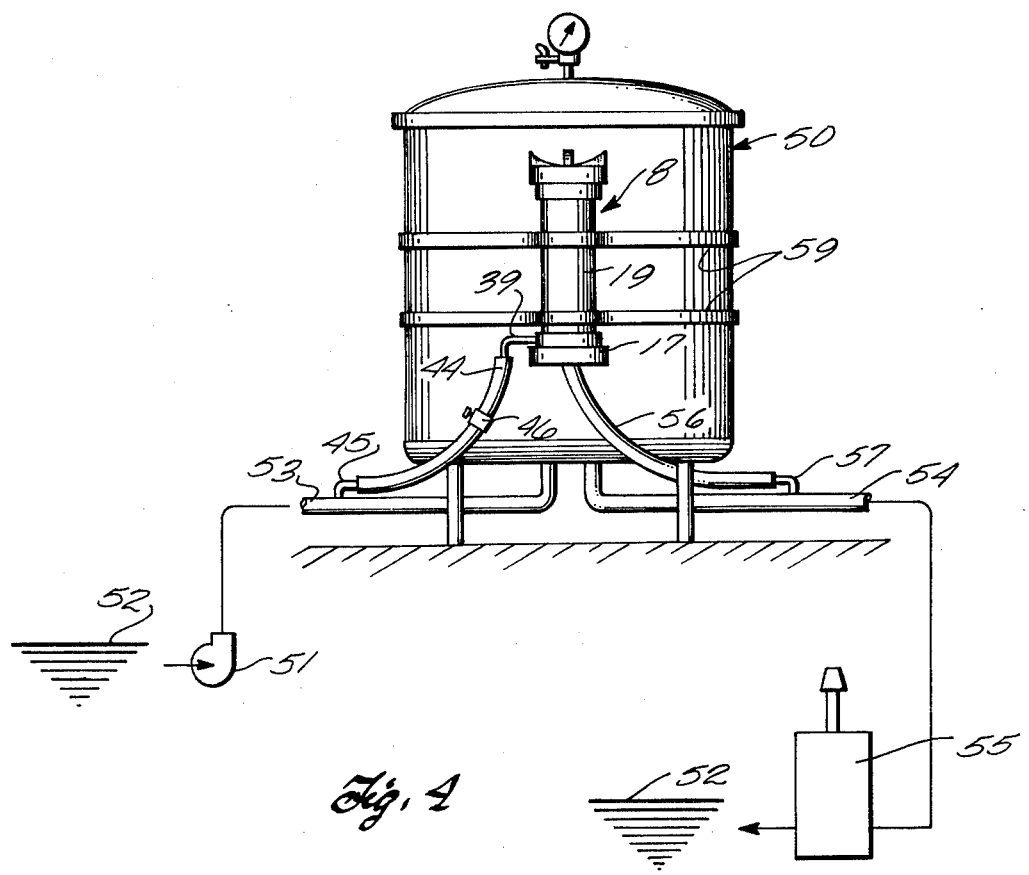

UNIVERSAL CHLORINATOR MODULE

This is a continuation of application Ser. No. 735,964, filed Oct. 27, 1976, and now abandoned.

BACKGROUND OF THE INVENTION

1. Field of the Invention

This invention pertains to a chlorinator useful with dry chlorine material for automatically adding a selected amount of chlorine to water circulated through a swimming pool.

2. Review of the Prior Art

U.S. Pat. No. 3,899,425 shows, in FIG. 3 thereof, a chlorinator which is useful with the modular filter assembly shown in FIGS. 1 and 2 of the patent. This chlorinator has several desirable features, including its usefulness with dry or pelletized chlorine material, its structural and operational simplicity, and its relatively low cost, in addition to its compatibility with the modular filter assembly. The filter assembly and the chlorinator described in U.S. Pat. No. 3,899,425 are commercially available and, since first being introduced, have enjoyed considerable commercial success.

Experience with the chlorinator described in U.S. Pat. No. 3,899,425 has shown that it suffers from certain problems. No problem is encountered when water flows continuously through the chlorinator. However, in most instances, the problem occurs when the flow of water through the chlorinator is interrupted for a period of several hours every day. In a home swimming pool installation in which a circulation system is provided, the timer-controlled circulation pump operates only part of the day. When no water flows through the filter assembly with which the prior chlorinator is used, water is often trapped in the lower portion of the chlorinator chamber. This residual water within the chlorinator is in direct contact with the soluble granular or pelletized chlorine material which dissolves to form a highly chlorinated water charge in the chlorinator. When the circulation pump is next turned on, a charge of overchlorinated water is injected into the swimming pool. The result is that, despite its many advantages and great commercial success, the chlorinator described in U.S. Pat. No. 3,899,425 often presents the problem of over-chlorination of the pool and waste of dry chlorine material.

In the chlorinator shown in U.S. Pat. No. 3,899,425, the position of the valve which controls the rate of flow of water through the chlorinator chamber is set with respect to normal operating conditions which correspond to periods when the pool circulation pump is operating. Any chlorination effect occurring during periods when the circulating pump is not operating is a chlorinating effect in excess of that desired and is, as a practical matter, very difficult to control or to compensate.

SUMMARY OF THE INVENTION

This invention provides a chlorinator which may be used with a modular filter assembly of the type shown in FIGS. 1 and 2 of U.S. Pat. No. 3,899,425, as well as with more conventional tank-type filter assemblies, in the circulation and purification system for a swimming pool. The present chlorinator is used with granular or pelletized dry chlorine material. The present chlorinator provides contact between the dry chlorine material and the pool water only during periods in which the pool circulation pump is operative. The flow of water through the chlorinator is more precisely regulated to provide improved control over the concentration of chlorine in the pool water. The present chlorinator is simple, effective, efficient and economic.

Generally speaking, this invention provides a chlorinator for use in swimming pool systems which have a filter assembly and a pump for circulating water from the pool through the filter assembly and back to the pool. The chlorinator comprises a housing which defines therein a selectively openable, airtight chamber. The chamber is adapted for receiving therein a quantity of water-soluble dry chlorine material. A water inlet port communicates to the chamber essentially at the bottom thereof. A separate water outlet port communicates from the chamber essentially at the bottom of the chamber. The inlet port is adapted for connection thereto of an adjustably valved duct by which water to be chlorinated can be applied to the inlet port. A check valve is coupled to the outlet port for preventing water flow through the outlet port to the chamber. The chlorinator is connectible in a pool system in parallel to the filter assembly, for example.

DESCRIPTION OF THE DRAWINGS

The above-mentioned and other features of this invention are more fully set forth in the following description of a presently preferred embodiment of the invention, which description is presented with reference to the accompanying drawings, wherein:

FIG. 2 is a side elevation view, partially in crosssection, illustrating the connection of the chlorinator module to a filter module;

FIG. 3 is an enlarged cross-sectional elevation view of the check valve associated with the chlorinator outlet port; and FIG. 4 is an elevation view showing the use of the chlorinator with a tank-type filter in a swimming pool circulation system.

DESCRIPTION OF THE ILLUSTRATED EMBODIMENT

Figure 1:
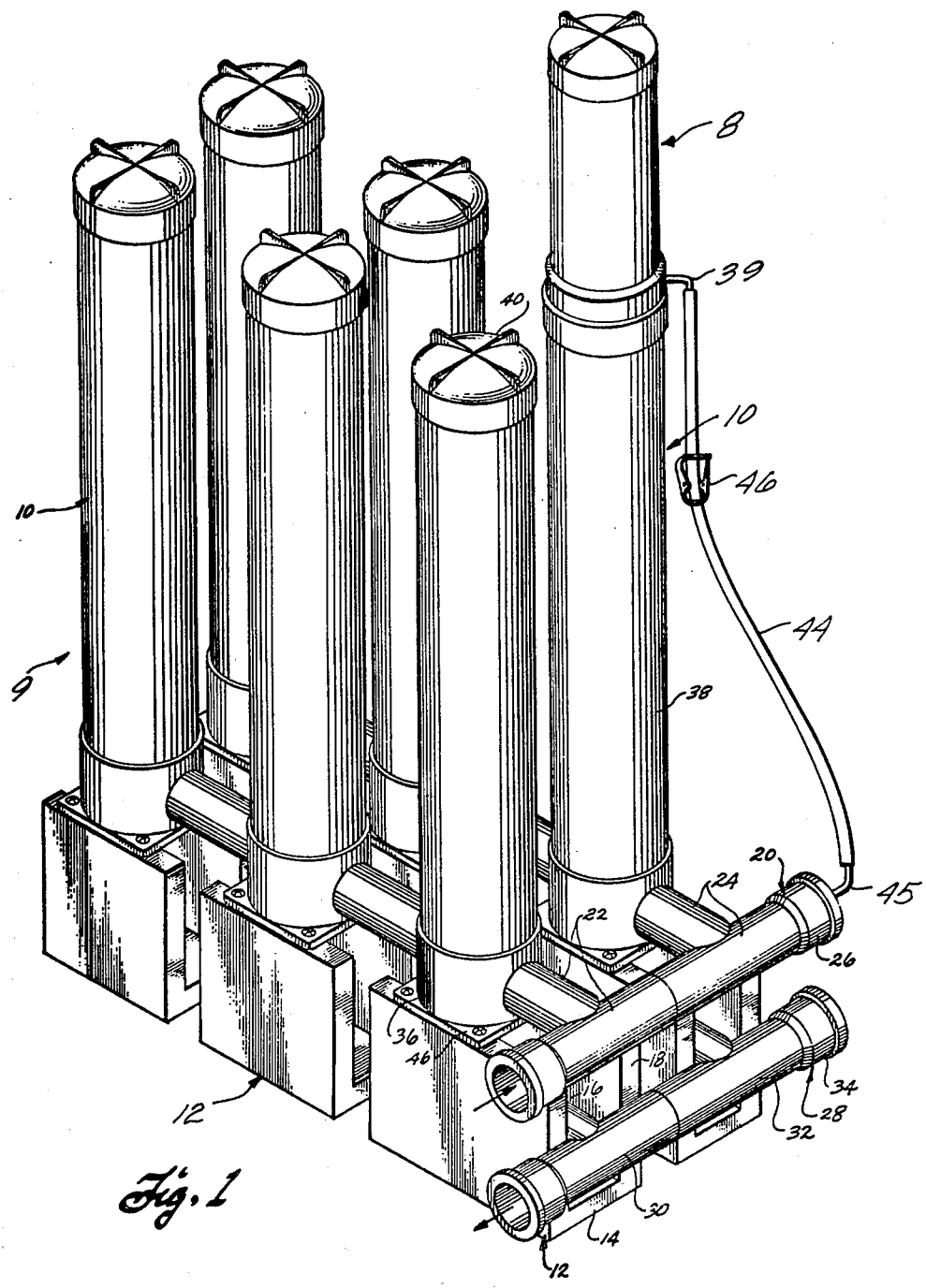
FIG. 1 is a perspective view of the chlorinator installed in conjunction with a filter assembly according to U.S. Pat. No. 3,899,425.

FIG. 1 shows a chlorinator 8 as used with a modular filter assembly 9 of the type described in U.S. Pat. No. 3,899,425. The assembly is composed of individual filter modules 10. The details of filter assembly 9 are set forth in U.S. Pat. No. 3,899,425 to which reference is made. Briefly, however, the several modules 10 are each located on a support member 12 which is of channel-like form having a base 14 and a pair of upwardly extending walls 16 and 18. The filter system has an intake manifold 20 having T connections 22 and 24 to the individual rows of filter modules. One end of inlet manifold 20 is closed with a cap 26, the other end of the manifold being open to serve as the inlet opening for water flow to the filter assembly. The output from the assembly 9 is via an outlet manifold 28 which has T connections 30 and 32 to the rows of filter modules and a cap 34 at one end. The other end of the outlet manifold is open to serve as the outlet opening from the filter assembly.

Each filter module includes a base 36, an upright cylindrical body 38 connected to the base, and a removable cap 40. Preferably, the inlet and outlet manifolds and the individual filter module bodies are all fabricated from polyvinyl chloride moldings or tubing. The body of each filter module conveniently is made from 3 inch diameter polyvinyl chloride pipe.

As shown in FIG. 2, each filter module 10 includes an annular elongate filter cartridge 11 which is disposed within the module body circumferentially around a tube 13. The tube has its upper end 15 located adjacent the upper end of the filter element just below the module cap or, in the case of the filter module to which chlorinator 8 is mounted, just below the base 17 of the chlorinator. The lower end of tube 13 has its outer circumference sealed to the bottom of the chamber in which the filter element 11 is located. The inner end of the tube communicates through the module base 36 to a duct 19 by which the tube is connected to the outlet manifold 28 of the filter assembly 9. The chamber inside which the filter element 11 is located is connected to the inlet manifold 20. As shown in FIG. 2, the upper end of the filter element 11 snugly abuts against the lower end of chlorinator base 17 or of cap 40, as the case may be; the lower end of each filter element is sealed to the bottom of the element chamber. During operation of the filter assembly, water is supplied by a pump (not shown, but compare FIG. 4) to the inlet manifold 20 and into each of the filter modules.

The water flow path in each module 10 is upwardly around the outer circumference of the filter element 11, and radially through the filter element into the annulus within the element around the circumference of the tube 13. Water then flows upwardly along the exterior of tube 13 toward the upper end of the filter module where it enters the interior of the tube to pass to the outlet manifold 28. The only way water can flow from the inlet to each filter chamber to the interior of a tube 13 is by this flow path. Accordingly, a substantial pressure drop exists between the inlet to each filter module and the interior of tube 13 within the module. This pressure drop is relied upon to assure proper operation of chlorinator 8 when a cap 40 from one of the filter modules 10 is removed and the chlorinator is connected to that filter module in place of the cap, as shown in FIG. 2.

Chlorinator 8 includes a base 17, a cylindrical body 19, and a removable covering cap 21. Preferably the base, the body and the cap are fabricated of polyvinyl chloride; the body conveniently can be a length of 3 inch diameter PVC pipe. The base has an internally threaded circumferential skirt 23 by which the base is connected to one of filter modules 10 in place of module cap 40. The base also has an annular skirt 27 which extends coaxially of skirt 23 from the opposite side of a web portion 29 which forms the partition between the chlorination chamber 35 and the filtration chamber of the filter module. One end of body 19 is disposed within and solvent welded to skirt 27 to affix the base to the body. A molded, externally threaded sleeve 31 is affixed to the opposite end of body 19 to receive internally threaded cap 21. An O-ring 33 cooperates as a gasket between the sleeve and cap 21 to provide an airtight seal between the sleeve and the cap when the cap is threaded onto the sleeve. Thus, the interior of the chlorinator defines an airtight chamber 35 which is selectively openable on removal of cap 21.

An inlet port 37 communicates to the interior of chlorinator chamber 35, essentially at the bottom thereof, through a side wall of the chamber. Preferably the inlet port is defined by a tapped hole through the skirt 27 and body 19 and into which a molded plastic elbow 39, having an integral tubing connection, is screwed. An outlet port 41 communicates to chamber 35 through the bottom of the chlorinator, i.e., through the web 29 of base 19 coaxially of the base. The coaxial positioning of outlet port 41 allows a check valve 42, coupled to the chlorinator at the outlet port, to project into the upper end of tube 13 in the filter module to which the chlorinator is connected; see FIG. 2.

Check valve 42 is shown in detail in FIG. 3. The preferred valve is of the ball type arranged to prevent flow of water into chamber 35 through the outlet port. The outlet port 41 from chamber 35 is tapped, and the coupling of the check valve to the outlet port is via external threads on the upper end of the check valve assembly. Preferably, the length of the check valve assembly along the axis of the chlorinator is less than the extent of skirt 23 along the same axis so that the check valve is located entirely within the recess bounded by skirt 23. The lower exterior portion of the check valve can be tapered, as at 43, to facilitate the connection of a length of tubing to the chlorinator outlet port via the check valve.

To complete the installation of chlorinator 8 to filter assembly 9, a duct is connected to elbow 39 and also to a similar elbow 45 which provides communication to intake manifold 20 through end cap 26. If chlorinator 8 is being added to an existing filter assembly 9, then the connection of elbow 45 to cap 26 will require that a hole be drilled and tapped in the intake manifold end cap. A valve 46 is provided in duct 44.

It has been found that certain synthetic resins are very satisfactory materials for equipment and accessories for swimming pools, particularly in association with pool chlorination systems. It is therefore preferred, as noted above, that chlorinator 8 including check valve 42, elbows 39 and 45 and duct 44 be fabricated of synthetic materials. A preferred duct is a heavy wall flexible vinyl tubing, and a preferred control valve mechanism 46 (as shown in FIG. 1) is of the pinch type through which the tubing extends. The valve 46 should be operable through a range from complete closure of the duct to an essentially full-open condition.

To install chlorinator 8 on the filter assembly 9, one merely removes one of caps 40 from one of the filter modules 10 and screws the chlorinator module to that filter module. As the chlorinator is screwed into place, the chlorinator check valve 42 is automatically inserted into the upper end of the exit tube 13 of the filter module. Elbow 45 is connected to the intake manifold, and duct 44 and valve 46 are connected as described. This is done at a time when no water is flowing through the filter assembly. At first, valve 46 is placed in its closed position. The chlorinator cap is removed, a charge of suitable "dry" chlorine material 48 is loaded into chamber 35, and the cap 21 is securely re-engaged with the chlorinator body to reestablish the airtight integrity of chamber 35. Then the pump for the filter assembly is turned on and valve 46 is opened to either a full ON or partial ON position.

The water pressure in intake manifold 20 is greater than the water pressure in outlet tube 13 in any of the filter modules. Thus, water flows through inlet port 37 into the chlorinator chamber 35 and via check valve 42 through outlet port 41. The water pressure at the inlet port 37, even as partially throttled by valve 46, is greater than atmospheric pressure. Accordingly, during periods when water flows through the chlorinator chamber, the level of water in the chlorinator is at some intermediate location between the top and bottom of the chlorinator chamber. The precise location of the air-water interface is dependent upon the pressure differential which exists between the chlorinator inlet and outlet ports. This differential obviously is affected by secondary factors such as the head loss associated with the ducting and valving between the inlet manifold and the inlet port, and the pressure losses associated with the check valve 42. Control valve 46 is adjusted on a trial and error basis until the proportion of water flowing through the chlorinator, relative to the volume of water passing through the filter assembly overall, is so adjusted that an appropriate level of chlorination is maintained in the swimming pool.

When the pool circulation pump is not operative, the pressure of water presented to inlet port 37 drops so that the compressed air bubble in the upper extent of the chlorinator chamber can expand to its initial volume which is that of chamber 35. Accordingly, when the circulation pump is shut down, there is no water in the chlorination chamber and no chlorinating action takes place.

As shown in FIG. 4, chlorinator 8 can be used to advantage with a tank-type filter 50. The chlorinator usually is coupled in parallel with the filter. Thus, in a typical pool system, a circulation pump 51 has its inlet connected to receive water from a swimming pool 52 and has its outlet connected by a supply pipe 53 to filter 50. The filter has an outlet pipe 54 which is connected to the inlet of a pool heater if a pool heater is provided; otherwise, the filter outlet pipe 54 is connected directly back to swimming pool 52. To install chlorinator 8 in the swimming pool system illustrated in FIG. 4, the inlet port of the chlorinator is connected by tubing 44 and control valve 46 to the filter supply pipe 53. The outlet port of the chlorinator is connected by a length of tubing 56 to the filter outlet pipe 54. Preferably, tubing 56 has one end connected to the check valve associated with the chlorinator outlet port, the other end of tubing 56 being connected to the filter outlet pipe via an elbow 57. The connection of tubing 44 and 56 to the filter supply and outlet pipes, respectively, via elbows 45 and 57 may require that holes be drilled and tapped into the respective pipes. The chlorinator may be positioned in any desired location relative to filter 50. A convenient placement of the chlorinator is on the side of the filter where it is held by suitable straps or cords 59 around both the chlorinator body and the filter tank. The chlorinator mounting must permit chlorinator cap 21 to be removed periodically so that the charge of dry chlorine material within the chlorinator can be replenished as needed.

Workers skilled in the art to which this invention pertains will readily appreciate that modifications, alterations, or variations in the structures described above may be practiced consistent with the teachings of the foregoing description and without departing from the scope of this invention. The invention has been described above with reference to the presently most-preferred embodiment of the chlorinator, as required by statute. It is therefore apparent that the preceding description is no exhaustive of all forms which chlorinators according to this invention may take. Accordingly, the foregoing description should not be considered as limiting the scope of this invention.

What is claimed is:

1. A chlorinator for use with a swimming pool system having an intermittently operated water circulation pump and a filter assembly, the chlorinator being adapted for placement on the filter assembly exteriorly thereof and comprising a housing defining therein a selectively openable airtight chamber adapted for receiving therein a quantity of water-soluble dry chlorine material and for trapping in the chamber upon closure thereof a quantity of air which is compressible in response to introduction to the chamber of water under pressure, a water inlet port communicating to the chamber essentially at the bottom thereof, and a separate water outlet port communicating from the chamber essentially at the bottom thereof, the inlet port being adapted for connection thereto of an exterior inlet duct by which water to be chlorinated can be applied under substantial pressure from the system to the inlet port and to rise in the chamber against and compress air trapped therein, the duct including a closable flow regulating valve, the outlet port being adapted for connection to an outlet duct for flow of water therefrom to the system at a location in the system downstream relative to the pump from the location of connection of the inlet duct to the system, and a check valve coupled to the outlet port for preventing water flow through the outlet port to the chamber, the inlet and outlet ports defining the only water flow openings so and from the chamber during operation of the chlorinator whereby air trapped in the chamber can expand to drive water from the chamber during periods when water is not supplied under said substantial pressure to the chamber via the inlet port, the check valve and the regulating valve when closed serving to prevent flow of water to the chamber when the chamber is opened for loading of dry chlorine material thereinto.

2. A chlorinator according to claim 1 wherein the inlet duct includes a length of flexible tubing connected to the inlet port, and the regulating valve is associated with the tube.

3. A chlorinator according to claim 2 wherein the regulating valve is of the pinch type and cooperates with the exterior of the tubing which extends through the valve.

4. A chlorinator according to claim 1 wherein the housing at the lower end thereof defines an internally threaded, annular skirt concentric to an axis, and the check valve is disposed coaxially of the skirt and has a length along the axis outside the chamber which is less than the length of the skirt along the axis.

* * * * *

UNITED STATES PATENT AND TRADEMARK OFFICE
CERTIFICATE OF CORRECTION

PATENT NO. :  4,210,624
DATED      :  July 1, 1980
INVENTOR(S) :  Kenneth E. Price It is certified that error appears in the above—identified patent and that said Letters Patent is hereby corrected as shown below:

Col. 6, line 3, delete "no" and insert -- not --;
Col. 6, line 35, delete "so" and insert -- to --;
Col. 6, line 47, delete "tube" and insert -- tubing --.

Signed and Sealed this

Eighteenth Day of November 1980

[SEAL]

*Attest:*

SIDNEY A. DIAMOND

*Attesting Officer*  *Commissioner of Patents and Trademarks*